US012607747B2

(12) United States Patent
Gigleux et al.

(10) Patent No.: US 12,607,747 B2
(45) Date of Patent: Apr. 21, 2026

(54) METHOD FOR TRACKING A SPACE OBJECT USING ON-BOARD RADAR AND LIDAR SYSTEMS

(71) Applicant: SPACEABLE, Paris (FR)

(72) Inventors: Benjamin Gigleux, Blagnac (FR); Julien Cantegreil, Paris (FR); Henri Carron, Toulouse (FR)

(73) Assignee: SPACEABLE, Paris (FR)

( * ) Notice: Subject to any disclaimer, the term of this patent is extended or adjusted under 35 U.S.C. 154(b) by 947 days.

(21) Appl. No.: 17/755,666

(22) PCT Filed: Nov. 3, 2020

(86) PCT No.: PCT/FR2020/051983
§ 371 (c)(1),
(2) Date: May 4, 2022

(87) PCT Pub. No.: WO2021/089938
PCT Pub. Date: May 14, 2021

(65) Prior Publication Data
US 2022/0390605 A1 Dec. 8, 2022

(30) Foreign Application Priority Data

Nov. 4, 2019 (FR) ................................. FR1912345

(51) Int. Cl.
*G01F 3/36* (2006.01)
*B64G 1/10* (2006.01)
*B64G 1/24* (2006.01)
*G01S 13/86* (2006.01)
*G01S 17/58* (2006.01)

(52) U.S. Cl.
CPC ............ *G01S 17/58* (2013.01); *B64G 1/1078* (2013.01); *B64G 1/244* (2019.05); *G01S 13/865* (2013.01)

(58) Field of Classification Search
CPC ......... G01S 7/58; G01S 13/865; B64G 1/244; B64G 1/1078
See application file for complete search history.

(56) References Cited

U.S. PATENT DOCUMENTS

2014/0107865 A1 4/2014 Griffith, Sr. et al.
2018/0052472 A1* 2/2018 Cherepinsky ........... G08G 5/74
(Continued)

OTHER PUBLICATIONS

International Search Report and Written Opinion of the International Searching Authority dated Feb. 24, 2021, in connection with International Application No. PCT/FR2020/051983, 16 pages.
(Continued)

*Primary Examiner* — Mark Hellner

(57) ABSTRACT

The invention relates to a method of tracking a target on an orbital trajectory by a spacecraft, the method comprising an acquisition phase which comprises the steps of activating a lidar, acquiring signals from the lidar system, determining target trajectory data from the lidar signals, wherein the spacecraft is engaged on a trajectory to approach or inspect the target, which trajectory is determined based on the target trajectory data, and if the target is no longer detected, activating a short-range detection phase, comprising activation of a wide-field radar.

14 Claims, 4 Drawing Sheets

(56) References Cited

U.S. PATENT DOCUMENTS

2018/0148197 A1 * 5/2018 Halsband ................. B64G 1/26
2019/0384303 A1 * 12/2019 Muller ................... G06N 20/00

OTHER PUBLICATIONS

Fehse, "Rendezvous with and Capture/Removal of Non-Cooperative Bodies in Orbit, The Technical Challenges," Journal of Space Safety Engineering, vol. 1, No. 1, Jun. 2014, 11 pages.
Flom, et al., "Multiple Target Tracking and Target Attitude Determination with a Scanning Laser Radar," Navigation: Journal of the Institute of Navigation, vol. 21, No. 4, Winter 1974-75, 12 pages.
Sepp, "CW Diode Laser Instrumentation for Rendez-vous and Docketing Manoeuvres in Geosynchronous Orbits," Proceedings of an ESA Workshop on Space Laser Applications and Technology, esa SP-202, May 1984, 7 pages.
International Preliminary Report on Patentability with translation of Written Opinion of the International Searching Authority dated May 19, 2022, in connection with International Application No. PCT/FR2020/051983, 9 pages.

* cited by examiner

METHOD FOR TRACKING A SPACE OBJECT USING ON-BOARD RADAR AND LIDAR SYSTEMS

CROSS REFERENCE TO RELATED APPLICATIONS

This application is a 371 National Stage of International Application No. PCT/FR2020/051983, filed Nov. 3, 2020, which claims priority to French Application No. FR1912345, filed Nov. 4, 2019, the disclosures of which are herein incorporated by reference in their entirety.

TECHNICAL FIELD

The present invention relates to a spacecraft system for detecting, locating, and tracking a space object, hereinafter referred to as "target". The target may be cooperative or non-cooperative, and maneuverable or non-maneuverable.

BACKGROUND

The invention relates more particularly to a navigation system embarked in a spacecraft, hereinafter referred to as a "hunter", this navigation system being configured to perform a "spatial rendezvous", i.e., to bring the hunter towards the target, with the aim of carrying out proximity operations with the target, such as an inspection, a formation flight, or a docking, while limiting the risks of collision.

Existing navigation systems suitable for such a mission typically employ a single active electromagnetic radar or lidar sensor. Some navigation systems can combine an active sensor with one or more passive sensors, such as infrared cameras or cameras in the visible optical domain offering a wide field of view. Indeed, the joint use of one or more passive sensors improves the performance of these systems compared to the use of a single active sensor. However, the performance of these passive sensors can be strongly degraded in case of rapid transition between day and night or between night and day. These passive sensors can also be damaged when exposed to direct sunlight. Passive sensors, even when used in combination with an active sensor, therefore do not improve performance and thus do not solve the problem of short-range flight safety under all operational conditions that may occur.

Furthermore, at close range, flight safety becomes an issue. The hunter should not introduce a higher risk of collision than the risk of collision with space debris inherent to the target's flight altitude. Therefore, to ensure safe short-range flight, the detection and localization system should be able to quickly find the target in the event of loss of tracking over a very wide angular field, even during rapid transitions between day and night or night and day.

Active sensors with a narrow field of view, generally used for space rendezvous missions, namely directional radars and scanning lidars, do not solve this problem. Active sensors with a wide field of view generally used for this type of mission, namely flash lidars, allow to quickly find the target in the event of loss of tracking. However, their accuracy is insufficient to guarantee the safety of the space rendezvous at short range. They are also sensitive to flicker phenomena of space targets which contribute to tracking losses and thus increase the risk of collision. Such flicker phenomena correspond to a large variation in the radar (or lidar) signal re-emitted by the target in the direction of the radar (or lidar). These variations depend on the orientation of the target with respect to the sensor, the geometry of the target, the flight conditions, etc.

SUMMARY

It is therefore desirable to reduce the risk of loss of tracking of a target, which may be caused by rapid transitions between day and night, or by variations in sensor sensitivity that may occur as the target passes between the sun and the hunter, or by flicker of target elements, or when the target performs highly dynamic maneuvers. In the event of a loss of tracking, it is desirable to detect the target within a short period of time to reset the tracking, and thus, to secure space rendezvous missions and operations performed by the hunter near the target.

Embodiments relate to a method of tracking, by means of a spacecraft, a target located on a known trajectory, the method including an acquisition phase comprising steps of: activating a lidar system in a scan mode to scan a region in an estimated direction of a target, acquiring signals from the lidar system, determining trajectory data of the target, using the acquired lidar system signals, engaging the spacecraft on a trajectory to approach or inspect the target, which trajectory is determined based on the target trajectory data, and if the target is no longer detected in the acquisition phase, activating a short-range detection phase of the target, comprising steps of: activating a wide field of view radar, acquiring and processing signals from the wide field of view radar to detect the target, and if the target is detected in the signals from the wide field of view radar, activating the acquisition phase, otherwise engaging the spacecraft on a retreat trajectory from the target.

According to an embodiment, the method comprises a long range detection phase, comprising steps of: activating in the spacecraft a narrow field of view radar in a scanning mode, acquiring and processing signals from the narrow field of view radar to detect a target, and upon detection of a target in the signals from the narrow field of view radar, determining trajectory data of the target based on the acquired signals from the narrow field of view radar, and activating the acquisition phase.

According to an embodiment, the method comprises the steps of: receiving static trajectory parameters of the target from a communication system, estimating target trajectory data based on the static trajectory parameters, and activating the long range detection phase when the estimated target position is at a distance from the spacecraft less than a first distance threshold value.

According to an embodiment, the method comprises, upon activation of the long range detection phase, steps of pointing the lidar system in a direction estimated based on the target trajectory data, and acquiring and processing signals from the lidar system to detect the target.

According to an embodiment, a narrow field of view radar is activated simultaneously with the lidar system, wherein data from the narrow field of view radar and the lidar system are merged using Kalman filters to refine the target trajectory data.

According to an embodiment, the wide field of view radar is alternately activated with a narrow field of view radar when the spacecraft is on the retreat trajectory.

According to an embodiment, when the target is detected by the wide field of view radar, the lidar system is pointed in an initial direction defined by target trajectory data determined from signals from the wide field of view radar or from a narrow field of view radar and then, in the absence of detection of the target by the lidar system, in successive directions along a first scan pattern.

According to an embodiment, when the target is detected by the wide field of view radar, a narrow field of view radar is pointed in an initial direction defined by target trajectory data determined from signals from the wide field of view radar and then, in the absence of detection by the narrow field of view radar, in successive directions along a second scan pattern.

According to an embodiment, when the target is detected by the lidar system or by a radar with a narrow field of view in the acquisition phase, the distance between the spacecraft and the target is compared to a second distance threshold value that is less than the first distance value and defines an inspection zone of the target where the spacecraft is engaged on an inspection trajectory of the target.

According to an embodiment, the method comprises a step of estimating a risk of collision with the target in the short-range detection phase or the acquisition phase, based on a trajectory followed by the spacecraft and estimated trajectory data of the target, and engaging the spacecraft on the retreat trajectory if the risk of collision is greater than a threshold value.

Embodiments may also relate to a computer program product loadable into a memory and which, when executed by a computer connected to the memory, configures the computer to implement the previously defined method.

Embodiments may also relate to a computer comprising interface circuits for receiving data from a wide field of view radar and a lidar system, and configured to implement the previously defined method.

According to an embodiment, the interface circuits are configured to receive data from a narrow field of view radar, or to transmit commands to, and receive data from a radar system having a field of view configurable between a wide field of view and a narrow field of view.

Embodiments may also relate to a spacecraft comprising the previously defined computer, a wide field of view radar and a lidar system.

BRIEF DESCRIPTION OF THE DRAWINGS

Embodiments of the invention will be exposed in the following description provided for exemplary purposes only, in relation to the appended drawings, in which.

DETAILED DESCRIPTION

In one embodiment, a spacecraft jointly uses a radar having an analog or digital scalable field of view and an analog or digital scanning lidar in a space rendezvous between the spacecraft (or hunter) and a space object (or target), in particular to enable the hunter to perform proximity operations on the target. The modular field of view of the radar makes it possible to optimize the link balance in a specific direction or on the contrary to cover a broad field of view in an instantaneous manner. The scanning lidar sensor provides the angular resolution and accuracy required for safe proximity operations by the hunter. Other sensors may be used in combination to improve target detection and tracking performance. The proximity operations performed by the hunter may include an inspection of the target and/or of its close environment (presence of debris, space weather, electromagnetic spectrum analysis), a docking of the hunter to the target and/or a maintenance operation of the target. The target may be a satellite, a space station, a spacecraft, or a piece of debris in orbit around a star or following a known trajectory in the solar system.

According to an embodiment, the radar is used initially in a narrow or directional field of view, to scan the hunter's environment progressively, until the target is detected and located. The lidar may be used to confirm the detection of the radar and to refine the localization data of the target provided by the radar. In case of loss of tracking of the target, the hunter being close to it, the wide field of view radar is used with a higher refresh rate than when the target is detected, to quickly find the target and direct the lidar towards the target to refine its location. The invention thus recovers the target tracking in a short time and compares two independent measurements of the target position, in particular to interrupt the rendezvous in case of anomaly. The joint use of two spectrally distant detection means reduces the risks of loss of target tracking, caused in particular by the flickering of the target in a given spectral band. The safety of short-range flight is thus increased.

Figures 1, 2:
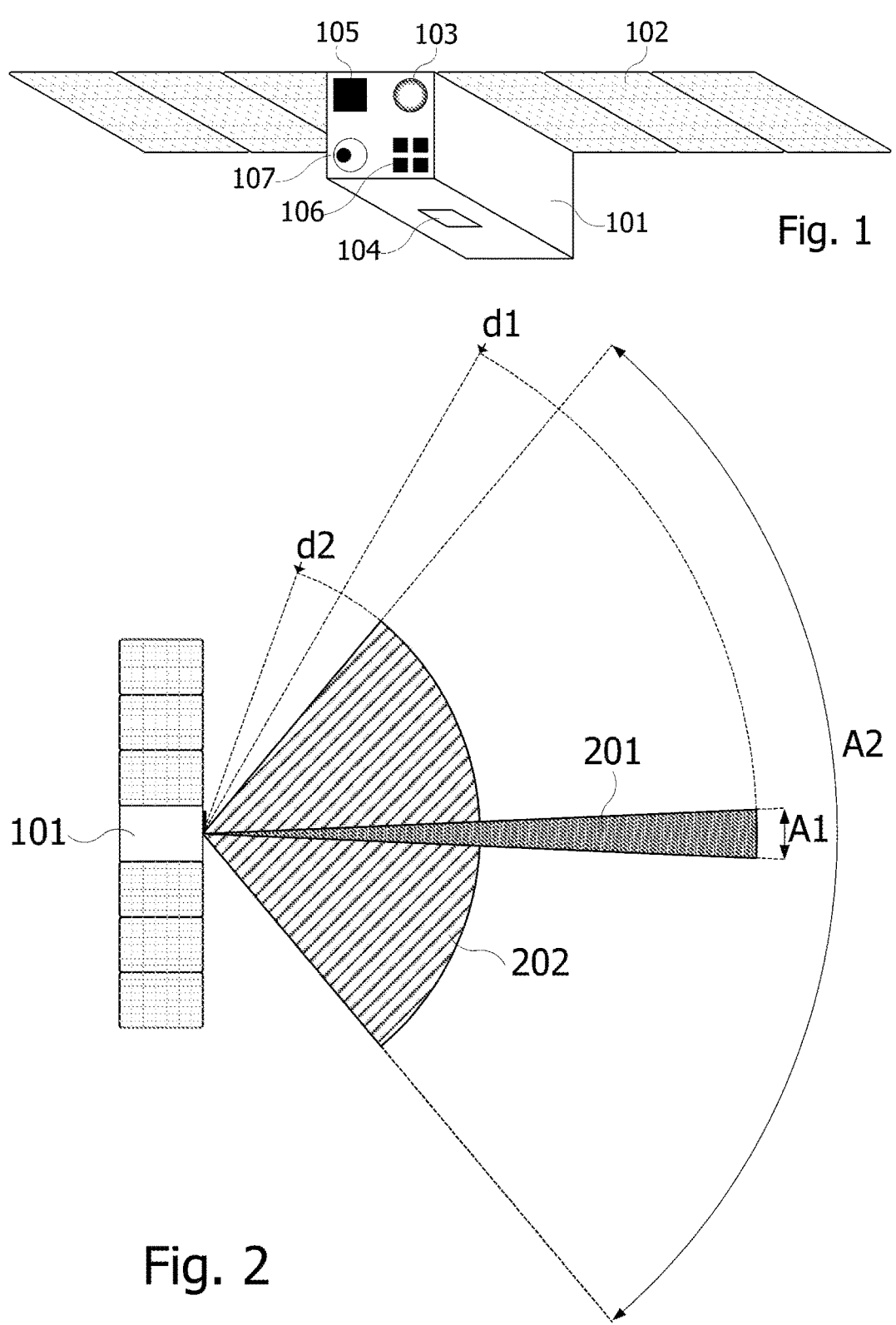
FIG. 1 schematically shows a spacecraft performing the function of a hunter, according to an embodiment, FIG. 2 schematically shows the fields of view of a radar system onboard the spacecraft, according to an embodiment, FIG. 3 schematically depicts a functional architecture of an on-board spacecraft navigation system, according to an embodiment, FIG. 4 schematically represents a hardware architecture of the spacecraft navigation system, according to an embodiment, FIG. 5 schematically represents a hardware architecture of a mission computer of the navigation system, FIG. 6 schematically illustrates different phases of a spacecraft rendezvous mission with respect to a target, according to an embodiment.

FIG. 1 depicts a hunter spacecraft 101, according to an embodiment. The hunter 101 is equipped with solar panels 102 to recover energy from solar radiation that is stored in batteries supplying electricity to on-board systems. The hunter 101 may include an imager 103 in the visible range to photograph a target during a target inspection phase. The hunter 101 may be a nano-satellite.

The hunter 101 may also include one or more of the following: an infrared range imager, a spectrum analyzer, a remote control configured to transmit commands to the target, a space weather analyzer configured to perform desired proximity operations.

The hunter 101 includes a telecommunications system 104 providing a communications link between the hunter and one or more ground or space stations. The hunter 101 can thus receive mission orders from an operator. The mission orders received may include data characterizing a trajectory allowing to estimate the position of a target at any time, this data being called in the following "static trajectory parameters". The telecommunication circuits also allow the hunter to transmit space data collected during the inspection of a target to a ground or space station.

According to an embodiment, the hunter 101 includes a configurable field-of-view radar system comprising a transmit antenna 105 and a plurality of receive antennas 106. The transmit antenna 105 transmits an incident radar signal propagating through space and reflecting off one or more targets that may be within the field of the incident radar signal. The receiving antennas 106 collect the reflected signals from the possible targets. The field of view of the radar system can be adjusted between a wide field of view and a narrow field of view.

According to another embodiment, the radar system comprises a wide field of view radar and a narrow field of view radar.

According to an embodiment, the hunter 101 includes a scanning lidar 107. The scanning may be performed by a mechanical or electronic device.

FIG. 2 depicts fields of view 201, 202 of the radar system, according to one embodiment. The radar system has a narrow field of view mode 201, in which transmitted energy and received energy are concentrated by the radar system in a given direction. The narrow field of view has an angular width A1 that may be the same in azimuth and elevation. According to an embodiment, the angular width A1 is between 3 and 10°, for example equal to 5°. The radar system has a wide field of view mode 202 used to observe a wide angular sector in a near-instantaneous manner. The wide field of view has an angular width A2 which may be identical in azimuth and elevation According to an exemplary embodiment, the angular width A2 is between 30° and 180°, for example equal to 100°.

According to an embodiment, the radar system is configured in a narrow field of view mode when the target is at a distance from the hunter 101 comprised between distances d1 and d2, and in a wide field of view mode when the target is at a distance from the hunter less than the distance d2. In an example, the distance d1 is between 1 and 5 km, and the distance d2 is between 50 m and 1000 m, for example equal to 500 m. The distance d1 depends on the sensitivity of the radar system in narrow field of view mode, and on the radar equivalent surface of the target, considering the parts of the target reflecting towards the radar the radiation emitted by the radar.

Figures 3, 4:
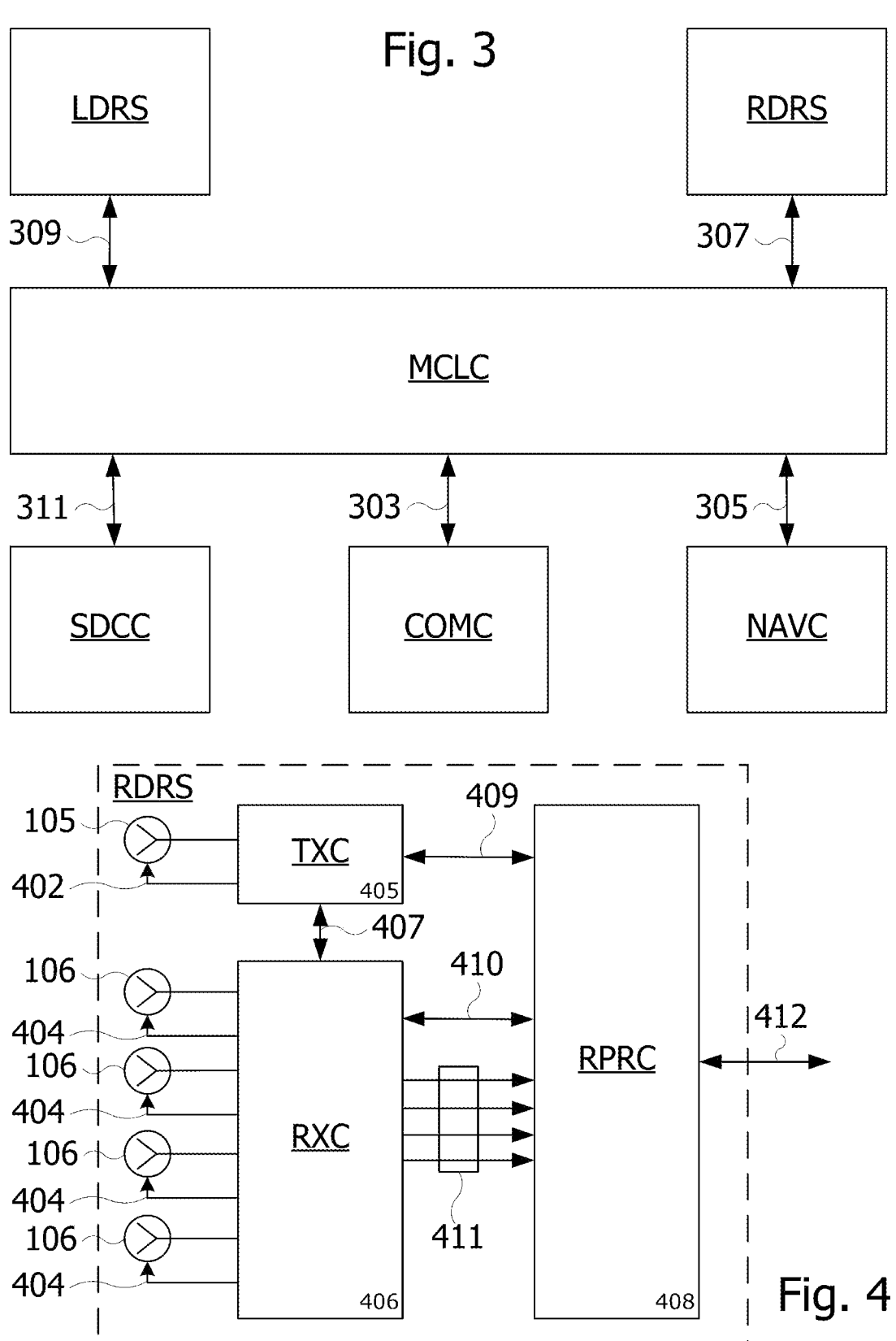

FIG. 3 shows a functional architecture of the navigation system of the hunter 101, according to an embodiment. The navigation system includes:

a mission computer MCLC,
 the telecommunication system COMC coupled to the computer MCLC through interface circuits 303,
 a navigation system NAVC coupled to the computer MCLC through interface circuits 305,
 the radar system RDRS coupled to the computer MCLC by interface circuits 307,
 the scanning lidar system LDRS coupled to the computer MCLC by interface circuits 309, and
 a spatial data acquisition system SDCC, for acquiring information about a target and its near vicinity, the system SDCC being coupled to the computer MCLC by interface circuits 311.

The computer MCLC is configured to receive mission orders from, and transmit data to the communication system COMC via the interface circuit 303. The computer MCLC is also configured to control the radar RDRS and lidar LDRS systems and the navigation system NAVC, and to receive and process data from these systems and the navigation system, via the interface circuits 305, 307, 309.

Using the telecommunication system COMC, a ground operator can transmit to the computer MCLC an inspection mission order including static trajectory parameters of a target, approximately determining the position of the target at any time. In the case of a satellite orbiting a celestial body, the static trajectory parameters include orbital parameters that may include the semi-major axis of the orbit, the eccentricity of the orbit, the inclination of the orbital plane, the longitude of the ascending node, the argument of the periastron, and the time of the target's passage at the periastron.

The navigation system NAVC may include a Global Navigation Satellite System (GNSS) receiver configured to determine the position of the hunter 101 in a geocentric frame of reference, one or more electric thrusters, inertial wheels, and magnetocouplers to orient the hunter in a desired direction. The navigation system may also include one or more chemical thrusters to orient the hunter in the desired direction, and a star finder to determine an orientation of the hunter with respect to the stars, such a device being known in the art as a "Star-Tracker".

According to an embodiment, the mission computer MCLC determines the trajectory to be followed by the hunter to position itself at the approach distance d1 from the assumed target position. To perform this, the mission computer MCLC uses the hunter's position in a reference frame, for example the geocentric reference frame, provided by the navigation system NAVC and the static trajectory parameters of the target, received by the communication system COMC. The trajectory to be followed is then implemented by the computer MCLC which determines the navigation commands to be transmitted to the navigation system NAVC.

According to an embodiment, the radar system RDRS comprises a Frequency-Modulated Continuous Wave (FMCW) radar, operating in a frequency band between 0.1 GHz and 100 GHz, for example in the 14.3 GHz-14.4 GHz frequency band. The radar is used to detect, locate and track the target as soon as the hunter arrives at the approach distance d1 to the assumed target position.

According to an embodiment, the lidar system LDRS includes a mechanically or electronically scanned lidar. The mechanically scanned lidar includes servo motors for directing lidar transmitting and receiving devices, based on commands issued by the mission computer MCLC. The radar RDRS and lidar LDRS systems provide detection data to the computer MCLC, which correlates and merges this data to confirm the presence of the target and refine the target position estimate, if necessary. The merging algorithm uses Kalman filters known to those skilled in the art to merge the radar data and the lidar data.

FIG. 4 shows the radar system RDRS, according to an embodiment. The radar system RDRS includes the active, electronically scanned transmit antenna 105, such as an Active Electronically Scanned Array (AESA) antenna. The transmit antenna 105 includes a control interface 402 for controlling the gain of the transmit antenna 105 and configuring it for wide field of view or narrow or directional field of view.

The radar system RDRS also includes active, electronically scanned receiving antennas 106. By comparing the phases of the signals received by the antennas 106, the direction of arrival of the target can be determined. According to an exemplary embodiment, the radar includes at least three receiver antennas 106 (four in the example of FIGS. 1 and 4). Each receiver antenna 403 includes a control interface 404 for controlling the receiver gain of the receiver antennas and setting the field of view of the antennas to wide field or narrow field or directional. The radar system RDRS includes transmission circuits TXC ensuring the generation of the radar signal to be transmitted which is supplied to the transmit antenna 401, and reception circuits RXC ensuring the filtering and digitization functions of the signals received by receiver antennas 106. An interface 407 allows the circuits TXC and RXC to synchronize.

The radar system RDRS also includes an radar signal processor RPRC that processes radar signals to detect and locate a target. An interface 409 is used to synchronize the processor RPRC with the transmit circuits TXC. An interface 410 synchronizes the processor RPRC with the receiver circuits RXC. A digital bus 411 ensures the transmission of signals digitized by the receiver circuits RXC to the processor RPRC.

The radar system RDRS also includes an input-output interface 412 for the radar processor RPRC to receive commands and provide trajectory data and data characterizing targets detected by the radar system. In the following, estimated "trajectory data" of a target refers to data defining at least two time-stamped positions of the target, which data may include estimated future positions, wherein each position may be associated with an error magnitude, or data defining a time-stamped position, associated with data defining a time-stamped velocity vector, wherein the velocity vector may also be associated with error magnitudes.

According to another embodiment, the radar system RDRS includes a wide field of view transmit antenna and a narrow field of view transmit antenna. The antenna selection is made by means of a circulator that routes the radar signal to be transmitted to the specified antenna while isolating the unspecified antenna.

Figures 5, 6:
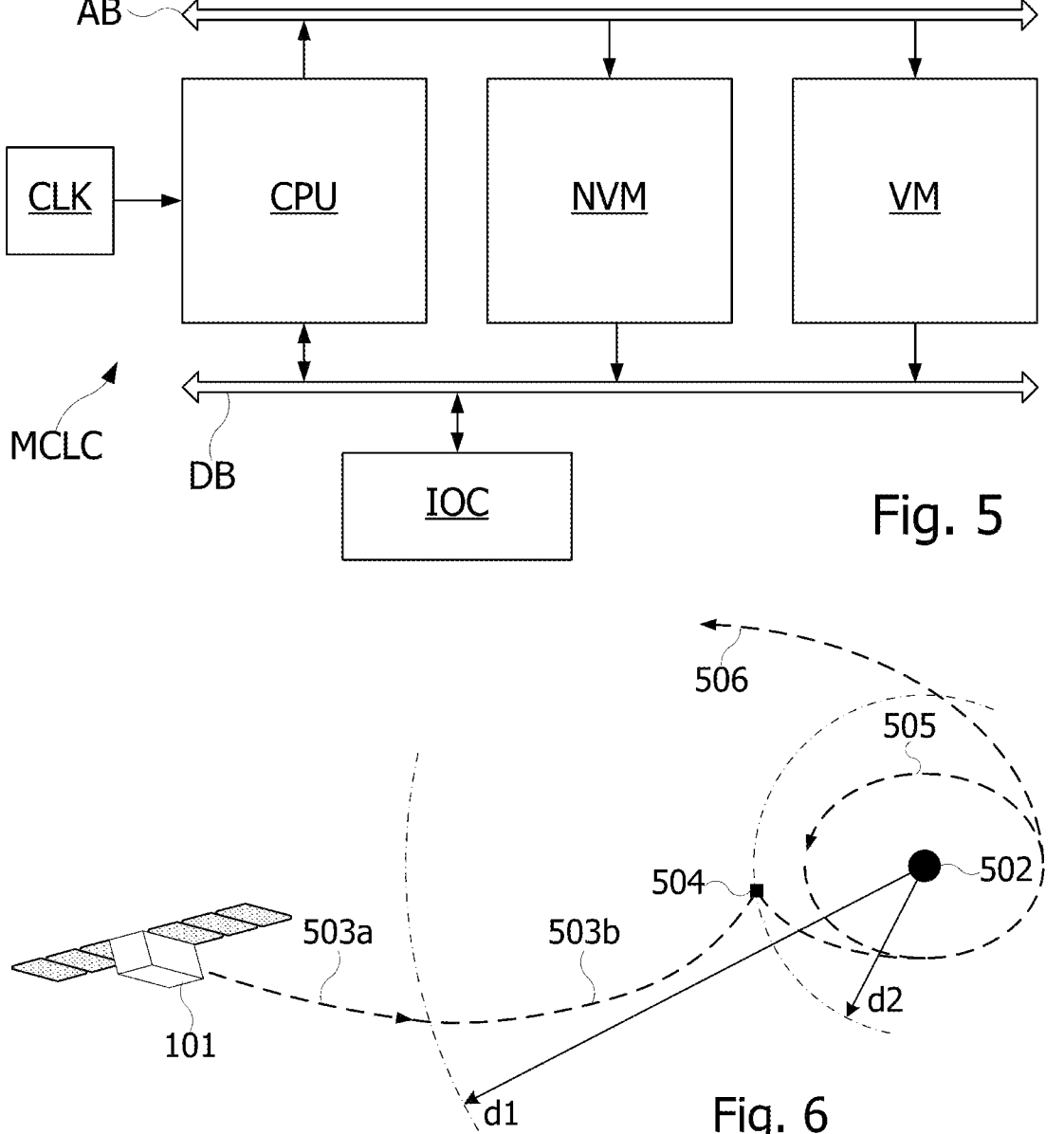

FIG. 5 schematically represents a hardware architecture of the mission computer MCLC onboard the spacecraft, according to an embodiment. The computer includes MCLC:

a central processing unit CPU configured to execute a mission program,
   a clock circuit CLK to provide a regular time reference to the computer,
   a non-volatile memory NVM, for example ROM (Read-Only Memory) containing the information for booting the CPU and the mission program,
   a RAM (Random Access Memory) for storing the data for operation after booting the CPU and during the execution of the mission program,
   an interface circuit IOC with input and/or output ports to connect the mission computer MCLC to other on-board systems (COMC, NAVC, RDRS, LDRS, SDCC),
   an address bus AB allowing the CPU to specify an access address in the NVM, VM memories, or an input and/or output port of the circuit IOC,
   a data bus DB allowing the exchange of information between the CPU, the NVM and VM memories, and the input and output ports of the circuit IOC.

The CPU may include one or more processors, and in particular a processor dedicated to processing signals from the radar system RDRS and/or the lidar system LDRS. For example, one of the processors may be dedicated to processing radar and lidar signals to correlate and merge these signals, for example by Kalman filters, and provide estimated trajectory data of objects detected by the radar system RDRS and/or the lidar system LDRS.

FIG. 6 illustrates an exemplary mission entrusted to the hunter 101, for example in the form of an order received by the communication system COMC. In the example of FIG. 6, this mission includes an inspection of a target 502 located on a known trajectory. Prior to the mission start, the hunter 101 is located on a standby trajectory, waiting to receive a mission order. The mission order specifies the static trajectory parameters of the target 502, for example orbital data in the case of a satellite in orbit around a celestial body.

According to an embodiment, a target inspection mission comprises:

(i) a very long range approach phase 503*a* to the target, up to distance d1 from the target 502, (ii) a target detection and localization phase 503*b*, between distances d1 and d2 from the target,
   (iii) an observation phase 504 of the target, at distance d1, to more accurately estimate the trajectory of the target and determine an inspection trajectory to be followed by the hunter,
   (iv) an inspection phase 505 of the target, automatically maintaining a sufficient distance to ensure mission safety, and
   (v) a retreat phase 506 from the target.

During the very long range approach phase 503*a*, the mission computer MCLC of hunter 101 controls the navigation system NAVC and uses the static target trajectory parameters to navigate to the distance d1 from the assumed target position 502.

During the detection and localization phase 503*b*, the mission computer MCLC controls the radar system RDRS to scan the environment in a directional field of view until the target 502 is detected and localized. During this phase, activation of the radar system RDRS may be performed periodically, in a narrow field of view mode.

Upon reaching the distance d2 from the assumed position of the target 502, typically 500 m, the mission computer MCLC switches to the observation phase 504, configuring the radar system RDRS to a narrow field of view, and pointing the radar RDRS and lidar LDRS systems in the direction of the target 502, as determined during the detection phase. The data from the RDRS and LDRS systems are used by the computer MCLC to more accurately estimate current and future trajectory parameters of the target 502.

The inspection phase 505 begins when the target trajectory 502 has been estimated and the flight conditions and required safety constraints are met. In a nominal case, the radar system RDRS remains configured in a directive field of view to reduce the power transmitted into space. The scanning lidar system LDRS is directed at the target 502 and its near environment. During the inspection phase 505, the tracking of the target may degrade, particularly in the case of spontaneous maneuvering of the target, or flickering of the target, during transitions between day and night, or the presence of the sun in the observed direction, which degradation may lead to a loss of tracking. As soon as a tracking degradation is observed by the computer MCLC, the radar system RDRS is automatically configured in a wide field of view to detect the target 502 within a short time.

At the end of the inspection, the computer MCLC enters the retreat phase 506, during which it controls the navigation system NAVC to move away from the target 502. The radar RDRS and lidar LDRS systems remain active until the relative distance between the hunter 101 and the target 502 is large enough to prevent any risk of collision even if the target maneuvers.

Figure 7:
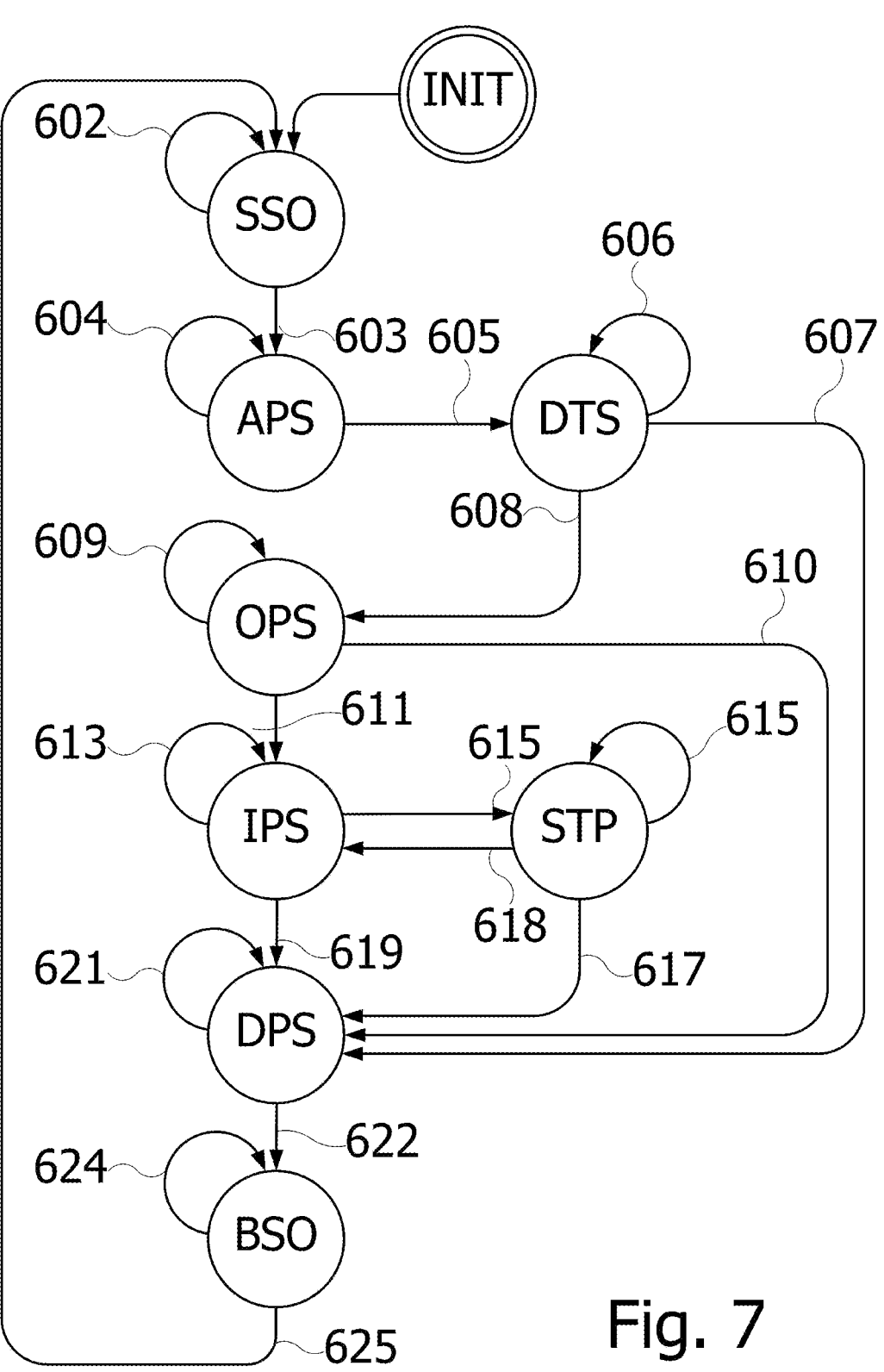
FIG. 7 shows a state and transition diagram illustrating the operation of the navigation system, according to an embodiment.

FIG. 7 illustrates an example of an algorithm implemented by the mission computer MCLC, according to an embodiment. After performing initialization operations INIT, the computer MCLC transitions to a standby state SSO, in which the hunter is held on a standby trajectory, such as a parking orbit. The computer MCLC remains in the state SSO until a mission command is received (condition 602). In this state, the computer MCLC maintains the hunter 101 on the standby trajectory using the navigation system NAVC to correct its trajectory in case of drift of the trajectory parameters.

Upon receipt of a mission command (condition 603), the computer MCLC exits the standby state SSO to transition to a long range approach state APS. The transition 603 between the states SSO and APS is triggered by the receipt of a mission command specifying the static trajectory parameters of a target 502, by the telecommunications system COMC. The computer MCLC remains in the approach state APS as long as the distance between the hunter and the assumed target position remains greater than the distance d1 (condition 604). In the approach state APS, the computer MCLC periodically estimates the distance between the hunter 101 and the target 502 based on the hunter's position in the geocentric reference frame, provided by the navigation system NAVC and the static trajectory parameters of the target. The computer MCLC also determines an approach path and navigates this approach path to the target until the distance d1 is reached.

When the distance d1 is reached (condition 605), the computer MCLC exits the approach state APS and transitions to the target detection state DTS, periodically activating the radar system RDRS configured in narrow field of view, to detect and locate the target 502. The radar system RDRS is configured in a narrow field of view to optimize the link budget. Indeed, at long range, the propagation losses in free space have a strong impact on the radar link budget. These losses can be partially compensated by concentrating the transmitted energy in a given direction, which makes it possible to detect the target without having to increase the transmitted power. In fact, the greater the power to be transmitted, the more it is necessary to isolate the receive antennas 106 from the transmit antennas 105 of the radar, in order to prevent crosstalk from saturating the receive chains connected to the receive antennas.

Initially, the radar beam is pointed in the direction of the estimated target position. The radar beam is wide enough in the narrow field-of-view mode to cover the angular range in which the target may physically be located. However, as long as the target is not detected, the radar beam is directed in different directions in a square or circular spiral pattern from the estimated target direction. The radar beam may be pointed electronically in the estimated direction of the target. Alternatively, the radar beam may be pointed mechanically in the estimated direction of the target by the navigation system provided for orienting the hunter, or by means of a motorized aiming system. The radar system RDRS may be kept active until the target is detected.

According to an embodiment, the radar system RDRS employs multiple linear frequency modulation waveforms. The parameters of the waveform are the transmission bandwidth, the rise time between the minimum and maximum frequency, the fall time between the maximum and minimum frequency, and the relaxation time during which the frequency remains at its minimum value. These parameters determine in part the performance of the radar, namely the distance accuracy, the distance resolution, the maximum unambiguous distance, the radial velocity accuracy, the radial velocity resolution, and the unambiguous radial velocity range.

Each waveform offers a compromise between unambiguous measurement range and the accuracy and resolution pair. To detect the target, the radar system employs a waveform with a wide unambiguous distance measurement and a wide unambiguous radial velocity measurement. After the first detection, the radar uses waveforms with high accuracy and resolution in distance and high accuracy and resolution in radial velocity. The ambiguity of the measurements associated with these waveforms is removed by the measurements obtained previously.

According to an embodiment, when the target 502 is detected, the radar system RDRS periodically alternates between an unambiguous wide range waveform and a high accuracy and resolution waveform.

When the target 502 is detected by the radar system RDRS, the computer MCLC uses the measurements provided by the radar system to refine the estimated trajectory data of the target using Kalman filters, providing estimates of the current position and future positions of the target. A volume is also defined around each calculated position, containing the target with a certain probability, considering the positioning errors and the errors of the Kalman filter models. This probability is set to a value between 0.5 and 0.9999, and preferably 0.9900. The defined volume is used for example for the estimation of the collision risk or to define the environment to be observed by the radar RDRS or the lidar LDRS.

The velocity vector of the target may be calculated from the radial velocity provided by the radar system and the tangential velocity calculated from several successive calculated positions of the target and the time elapsed between these successive positions.

The computer MCLC remains in the detection state DTS as long as the "hunter out of inspection zone" condition 606 is true. The inspection zone corresponds to a sphere of radius d2 centered on the assumed or estimated position of the target 502.

The computer MCLC exits the detection state DTS to a retreat state DPS when a condition 607 "hunter in inspection area and target not detected" is true. This transition condition corresponds to the absence of a detection confirming the presence of the target 502 or its detectability, while the hunter 101 has reached a distance less than or equal to the distance d2 from the assumed target position.

The computer MCLC exits the detection state DTS to an observation state OPS when condition 608 "hunter in inspection area and target detected" is true. This transition condition implies that the target is detected and the hunter 101 is located within a distance d2 of the estimated target position 502.

The computer MCLC remains in the observation state OPS as long as condition 609 "inspection maneuver under calculation and acceptable risk of collision" is true. In the state OPS, the computer MCLC evaluates the risk of collision with the target 502 based on the observation position of the hunter 101 relative to the estimated position of the target 502. In the observation state OPS, the computer MCLC controls the navigation system NAVC to remain at a constant distance from the estimated target position. To this end, the computer MCLC periodically activates the radar system RDRS configured in narrow field of view, and optionally the lidar system LDRS, to detect and locate the target. If the lidar system LDRS is activated, it is used to confirm and refine the target position determined by the radar system RDRS.

The initial pointing direction of the lidar corresponds to the last calculated position of the target 502. The lidar system transmits a frequency-modulated electromagnetic wave, and samples the received signal. The hunter-target distance is determined according to the sampling timestamp corresponding to the sample where the target is detected in the received signal, knowing that the timestamp of this sample determines the outward travel duration of the wave between the transmitter and the target, and the return travel duration between the target and the receiver, the outward and return distances being assumed identical. If the target is not detected in the initial pointing direction, the lidar system LDRS scans around the initial pointing direction, following a scan pattern. This pattern may be a spiral, such as the Galilean spiral, or concentric closed curves, such as circles or ellipses centered on the assumed target position. The lidar scan is performed periodically from the assumed target position. The assumed position of the target 502 is determined based on the last known position and estimated target trajectory data, and the time elapsed since the last known position was obtained.

Data from the radar RDRS and lidar LDRS systems are correlated and merged by, for example, Kalman filters to track the target and more accurately estimate the target's trajectory data. The computer MCLC also determines one or more inspection trajectories and a risk of collision with the target, associated with each trajectory, and selects an inspection trajectory associated with an acceptable risk of collision. The risk of collision may be estimated based on the trajectory data of the hunter 101, and the last known location data of the target 502, considering all possible maneuvers of the target, where each maneuver may be weighted by its probability of occurrence if it can be estimated. To guarantee a high level of flight safety, the risk of collision may be evaluated by also considering events with a low probability of occurrence, such as a failure of a GNSS satellite used to estimate the position of the hunter.

If the target is lost in the observation state OPS, the computer MCLC keeps the radar system RDRS active by continuing to scan the environment and controls the hunter 101 to hold position based on the estimated position of the target 502 from the latest location data received from the radar RDRS and lidar LDRS systems. The risk of collision is then evaluated by also considering the time elapsed since the last detection of the target. The computer MCLC may also periodically perform tests of the proper operation of the hunter 101.

The computer MCLC exits the observation state OPS to the retreat state DPS when a condition 610 "unacceptable risk of collision associated with the observation position" is true. The transition condition 610 corresponds to an unacceptable risk of collision while observing the target. The risk of collision may also be unacceptable if there is insufficient tracking data for the target, or if a spontaneous maneuver of the target 502 is detected, or if there is a malfunction of the hunter 101.

The computer MCLC exits the observation state OPS to an inspection state IPS when an "inspection trajectory calculated" condition 611 is true. The transition condition 611 corresponds to the obtention of a satisfactory inspection trajectory, especially with respect to the risk of collision with the target 502, which supposes there is sufficient tracking data for the target.

The computer MCLC remains in the IPS inspection state as long as a condition 613 is true, i.e., when the inspection success criteria are not yet met, the collision risk associated with the inspection maneuver remains acceptable, and the target tracking data remain sufficient. The inspection success criteria are dependent on the mission order and may correspond, for example, to sufficient quality and diversity of the information collected for the target 502. In the inspection state IPS, the computer MCLC periodically activates the radar system RDRS configured in narrow field of view and the lidar system LDRS to detect and locate the target. Data from the systems RDRS and LDRS are correlated and merged, for example, using Kalman filters, to locate the target 502 and more accurately determine the target's trajectory data. The computer MCLC controls the navigation system NAVC to periodically correct the hunter trajectory to follow the previously calculated inspection trajectory at the observation state OPS. The computer MCLC periodically calculates the risk of collision associated with the inspection trajectory, based on the hunter 101 navigation data relative to the target 502 location data. In the inspection state IPS, and according to the mission order, the computer MCLC activates the spatial data acquisition system SDCC to acquire information relating to the target 502 and its close vicinity.

The computer MCLC exits the inspection state IPS to the retreat state DPS when a condition 619 is true, reflecting that inspection success criteria are met or that the risk of collision associated with the inspection maneuver is unacceptable.

The computer MCLC exits the inspection state IPS to an inspection abort state STP when a condition 615 of loss of tracking or insufficient tracking data is true. Condition 615 is true when the inspection success criteria are not yet met, the collision risk associated with the inspection maneuver remains acceptable, and the target tracking data are insufficient. The transition condition 615 results from a degradation in the detection of the target 502 in the state IPS, which degradation may be caused by flickering of a reflective surface of the target. The loss-of-tracking condition may be reached when the target 502 is not detected in N of the last M consecutive acquisitions by the radar RDRS and/or lidar LDRS systems.

The computer MCLC remains in the inspection abort state STP as long as the target loss-of-track condition 615 is true and as long as a delay since the start of the loss-of-track condition has not expired. In the loss-of-track condition STP, the computer MCLC controls the navigation system NAVC to follow the inspection path and determines the elapsed time since the transition to the loss-of-track condition. The computer MCLC also periodically controls the wide field of view configured radar system RDRS 202 to observe its surroundings in a near-instantaneous manner for the purpose of finding the target 502. Another sensor system such as the lidar system LDRS may also be activated in the STP state to re-locate the target.

The computer MCLC exits the loss-of-tracking state STP to return to the inspection state IPS when a target tracking condition 618 is true. The transition condition 618 corresponds to the resumption of tracking following the detection of the target 502 by one or more sensors onboard the hunter 101. The field of view of the radar system RDRS may then be progressively reduced until it reaches the narrow field of view 201. With each new acquisition, the radar is pointed so as to center the radar's field of view on the direction of the target determined from the signals provided by the radar system RDRS or the lidar system LDRS during the previous acquisition.

The computer MCLC exits the loss-of-tracking state STP to the retreat state DPS when an expired delay condition 617 is true, namely when the target 502 is still not detected and the delay since the loss-of-tracking has expired.

The computer MCLC remains in the retreat state DPS as long as a condition 621 "hunter in inspection zone" is true, in other words, as long as the hunter 101 is at a distance less than or equal to the distance d2, from the estimated position of the target 502. In the retreat state DPS, the computer MCLC determines a retreat trajectory and controls the navigation system NAVC to direct the hunter along that trajectory. In addition, the computer MCLC periodically activates the radar system RDRS configured in a mode alternating wide field of view and narrow field of view to detect and locate the target 502. The computer MCLC may also activate one or more other sensors to detect and locate the target.

The computer MCLC exits the retreat state DPS into a "return to standby trajectory" state BSO, such as its parking orbit, when a condition 622 "hunter out of inspection area" is true. The transition condition 622 is true when the estimated position of the target 502 is at a distance greater than the distance d2 from the hunter 101. In the "return to standby trajectory" state BSO, the computer MCLC controls the navigation system NAVC to proceed to the standby trajectory. The computer MCLC remains in the state BSO as long as a condition 624 "hunter out of standby trajectory" is true, i.e., as long as the hunter has not returned to its standby trajectory.

The computer MCLC exits the "return to standby trajectory" state BSO to the "hold standby trajectory" state SSO when the hunter 101 has reached its standby trajectory (condition 625).

The previously described provisions ensure the safety of the short range space rendezvous, by minimizing the risks of loss of tracking of the target and by reducing the duration of the possible losses of tracking. Indeed, the implementation of at least two active sensors operating on the basis of transmitted and received signals at distant spectrums, reduces the risk of tracking loss by decorrelating the target flickering in the observed spectral bands, and by increasing resilience to rapid transitions between day and night and to interference with other electromagnetic signals. The implementation of a wide field-of-view radar system allows for rapid detection of the target, especially when the target is at close range and has just performed an uncooperative maneuver. By increasing the safety of such a space rendezvous, it is thus possible to reduce the safety distance between the hunter and the target, without increasing the risk of collision, allowing proximity operations to be performed automatically at shorter distances, such as a detailed inspection or docking.

It will be clear to the person skilled in the art that the present invention is susceptible to various alternatives and applications. In particular, the invention is not limited to the sequence of steps described with reference to FIG. 7, and to the list of sensors activated at each of these steps. It suffices that the hunter goes through phases of detecting the target at long range, then acquiring the target when it is detected, and detecting the target at short range when the hunter no longer detects the target when it is close.

The invention is also not limited to periodic activations of the radar and lidar systems. For example, the moment of activation of one of these systems may be defined randomly or determined as a function of the previously acquired signals, and in particular as a function of the accuracy of these signals. Thus, the time interval between two acquisitions can be reduced if the accuracy is not satisfactory.

Alternatively, the long-range detection phase DTS may be omitted when the static trajectory parameters provided in the mission order are sufficiently accurate to allow the narrow-field-of-view configured radar and/or lidar to be pointed at the target (502).

The invention claimed is:

1. A method of tracking, by means of a spacecraft, a target located on a known trajectory, the method including an acquisition phase comprising steps of:
    activating a lidar system in a scan mode to scan a region in an estimated direction of a target,
    acquiring signals from the lidar system,
    determining trajectory data of the target, using the acquired lidar system signals, engaging the spacecraft on a trajectory to approach or inspect the target, which trajectory is determined based on the target trajectory data, and
    if the target is no longer detected in the acquisition phase, activating a short-range detection phase of the target, comprising the steps of:
    activating a wide field of view radar,
    acquiring and processing signals from the wide field of view radar to detect the target, and
    if the target is detected in the signals from the wide field of view radar, activating the acquisition phase, otherwise engaging the spacecraft on a retreat trajectory from the target.

2. The method of claim 1, comprising a long range detection phase, comprising steps of:
    activating in the spacecraft a narrow field of view radar in a scanning mode,
    acquiring and processing signals from the narrow field of view radar to detect a target, and
    upon detection of a target in the signals from the narrow field of view radar, determining trajectory data of the target based on the acquired signals from the narrow field of view radar, and activating the acquisition phase.

3. The method of claim 2, comprising the steps of:
    receiving static trajectory parameters of the target from a communication system,
    estimating target trajectory data based on the static trajectory parameters, and
    activating the long range detection phase when the estimated target position is at a distance from the spacecraft less than a first distance threshold value.

4. The method of claim 3, comprising, upon activation of the long range detection phase, steps of pointing the lidar system in a direction estimated based on the target trajectory data, and acquiring and processing signals from the lidar system to detect the target.

5. The method of claim 1, wherein, a narrow field of view radar is activated simultaneously with the lidar system, wherein data from the narrow field of view radar and the lidar system are merged using Kalman filters to refine the target trajectory data.

6. The method of claim 1, wherein the wide field of view radar is alternately activated with a narrow field of view radar when the spacecraft is on the retreat trajectory.

7. The method of claim 1, wherein, when the target is detected by the wide field of view radar, the lidar system is pointed in an initial direction defined by target trajectory data determined from signals from the wide field of view radar or from a narrow field of view radar and then, in the absence of detection of the target by the lidar system, in successive directions along a first scan pattern.

8. The method of claim 1, wherein, when the target is detected by the wide field of view radar, a narrow field of view radar is pointed in an initial direction defined by target trajectory data determined from signals from the wide field of view radar and then, in the absence of detection by the narrow field of view radar, in successive directions along a second scan pattern.

9. The method of claim 1, wherein, when the target is detected by the lidar system or by a radar with a narrow field of view in the acquisition phase, a distance between the spacecraft and the target is compared to a second distance threshold value that is less than a first distance value and defines an inspection zone of the target where the spacecraft is engaged on an inspection trajectory of the target.

10. The method of claim 1, comprising a step of estimating a risk of collision with the target in the short-range detection phase or the acquisition phase, based on a trajectory followed by the spacecraft and estimated trajectory data of the target, and engaging the spacecraft on the retreat trajectory if the risk of collision is greater than a threshold value.

11. A non-transitory computer readable memory storing a program and which, when executed by a computer connected to the memory, configures the computer to:
   activate a lidar system (LDRS) in a scan mode to scan a region in an estimated direction of a target,
   acquire signals from the lidar system,
   determine trajectory data of the target, using the acquired lidar system signals,
   engage the spacecraft on a trajectory to approach or inspect the target, which trajectory is determined based on the target trajectory data, and
   if the target is no longer detected in the acquisition phase, activate a short-range detection phase (STP) of the target, wherein the computer is further configured to:
   activate a wide field of view radar,
   acquire and processing signals from the wide field of view radar to detect the target, and
   if the target is detected in the signals from the wide field of view radar, activate the acquisition phase, otherwise engage the spacecraft on a retreat trajectory from the target.

12. A computer comprising:
   interface circuits for receiving data from a wide field of view radar; and
   a lidar system (LDRS), wherein the computer is configured to: activate the lidar system (LDRS) in a scan mode to scan a region in an estimated direction of a target,
   acquire signals from the lidar system,
   determine trajectory data of the target, using the acquired lidar system signals,
   engage the spacecraft on a trajectory to approach or inspect the target, which trajectory is determined based on the target trajectory data, and
   if the target is no longer detected in the acquisition phase, activate a short-range detection phase (STP) of the target, wherein the computer is further configured to:

activate a wide field of view radar,
acquire and processing signals from the wide field of view radar to detect the target, and
if the target is detected in the signals from the wide field of view radar, activate the acquisition phase, otherwise engage the spacecraft on a retreat trajectory from the target.

13. The computer of claim 12, wherein the interface circuits are configured to receive data from a narrow field of view radar, or to transmit commands to, and receive data from a radar system having a field of view configurable between a wide field of view and a narrow field of view.

14. A spacecraft comprising:
   a computer;
   a wide field of view radar; and
   a lidar system,
   wherein the computer comprises interface circuits for receiving data from the wide field of view radar,
   wherein the computer is configured to:
   activate the lidar system (LDRS) in a scan mode to scan a region in an estimated direction of a target,
   acquire signals from the lidar system,
   determine trajectory data of the target, using the acquired lidar system signals,
   engage the spacecraft on a trajectory to approach or inspect the target, which trajectory is determined based on the target trajectory data, and
   if the target is no longer detected in an acquisition phase, activate a short-range detection phase (STP) of the target, wherein the computer is further configured to:
   activate a wide field of view radar,
   acquire and processing signals from the wide field of view radar to detect the target, and
   if the target is detected in the signals from the wide field of view radar, activate the acquisition phase, otherwise engage the spacecraft on a retreat trajectory from the target.

* * * * *